US009463581B2

(12) United States Patent
Yamaguchi et al.

(10) Patent No.: US 9,463,581 B2
(45) Date of Patent: Oct. 11, 2016

(54) KNEADING DEGREE ADJUSTING MECHANISM, EXTRUDER, CONTINUOUS MIXER, KNEADING DEGREE ADJUSTING METHOD, AND KNEADING METHOD

(75) Inventors: Kazuo Yamaguchi, Takasago (JP); Yasuaki Yamane, Takasago (JP); Katsunori Takahashi, Takasago (JP); Taiji Orimo, Takasago (JP); Sayaka Yamada, Kobe (JP); Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1246 days.

(21) Appl. No.: 12/681,121

(22) PCT Filed: Oct. 31, 2008

(86) PCT No.: PCT/JP2008/069888
§ 371 (c)(1),
(2), (4) Date: Apr. 1, 2010

(87) PCT Pub. No.: WO2009/057753
PCT Pub. Date: May 7, 2009

(65) Prior Publication Data
US 2010/0271901 A1    Oct. 28, 2010

(30) Foreign Application Priority Data

Nov. 2, 2007 (JP) ................................. 2007-286287

(51) Int. Cl.
*B29B 7/42* (2006.01)
*B29C 47/60* (2006.01)
(Continued)

(52) U.S. Cl.
CPC ........... *B29B 7/421* (2013.01); *B29C 47/6037* (2013.01); *B29C 47/822* (2013.01);
(Continued)

(58) Field of Classification Search
CPC ........................... B29C 47/667; B29B 7/421
USPC .................................. 366/79, 80, 82, 84, 85
See application file for complete search history.

(56) References Cited

U.S. PATENT DOCUMENTS 2,519,014 A * 8/1950 Bankey ........................ 425/208
3,070,836 A * 1/1963 De Haven et al. .......... 264/40.7
(Continued)

FOREIGN PATENT DOCUMENTS

JP  62 33422      2/1987
JP  62-33422 U   2/1987
(Continued)

OTHER PUBLICATIONS

U.S. Appl. No. 12/864,538, filed Jul. 26, 2010, Yamada, et al.
(Continued)

*Primary Examiner* — David Sorkin
*Assistant Examiner* — Abbas Rashid
(74) *Attorney, Agent, or Firm* — Oblon, McClelland, Maier & Neustadt, L.L.P.

(57) ABSTRACT

The degree of kneading of a material to be kneaded is to be capable of being adjusted with a high accuracy.

A kneading degree adjusting mechanism is installed in a processing apparatus having a barrel and a kneading screw inserted into the barrel rotatably, the kneading screw having a kneading section and rotating within the barrel to knead a material continuously while feeding the material from an upstream side toward a downstream side. The kneading degree adjusting mechanism includes a push-back section for pushing back the material to the upstream side and thereby making the material stay around the kneading section, the push-back section being disposed downstream of the kneading section in the kneading screw; a kneading degree adjusting member having an opposed surface opposed to an outer periphery surface of the push-back section; and a drive section for actuating the kneading degree adjusting member so that the opposed surface moves toward and away from the push-back section.

20 Claims, 10 Drawing Sheets

(51) Int. Cl.
 *B29C 47/00* (2006.01)
 *B29C 47/82* (2006.01)

(52) U.S. Cl.
 CPC ............ *B29C47/0009* (2013.01); *B29C 47/82* (2013.01); *B29C 2947/926* (2013.01); *B29C 2947/92542* (2013.01); *B29C 2947/92876* (2013.01)

(56) References Cited

U.S. PATENT DOCUMENTS

| | | | | |
|---|---|---|---|---|
| 4,007,545 | A | * | 2/1977 | Briggs ............................. 34/397 |
| 4,074,362 | A | * | 2/1978 | Kruder et al. ................... 366/82 |
| 4,136,968 | A | * | 1/1979 | Todd ................................ 366/85 |
| 4,332,481 | A | * | 6/1982 | Inoue et al. ..................... 366/84 |
| 4,462,691 | A | * | 7/1984 | Boguslawski .................. 366/80 |
| 4,600,311 | A | * | 7/1986 | Mourrier et al. ............... 366/88 |
| 4,640,672 | A | * | 2/1987 | Ellwood .................... 425/192 R |
| 4,960,328 | A | * | 10/1990 | Schumacher et al. .......... 366/80 |
| 5,145,251 | A | * | 9/1992 | Shirato et al. .................. 366/80 |
| 5,145,352 | A | * | 9/1992 | Capelle et al. ............... 425/205 |
| 5,147,198 | A | * | 9/1992 | Capelle .......................... 425/205 |
| 5,244,373 | A | * | 9/1993 | Capelle et al. ............... 425/208 |
| 5,880,548 | A | * | 3/1999 | Lamb ............................ 310/103 |
| 6,238,079 | B1 | * | 5/2001 | Watada et al. .................. 366/80 |
| 6,280,074 | B1 | * | 8/2001 | Kuroda et al. ............... 366/76.3 |
| 7,635,217 | B2 | * | 12/2009 | Rokey et al. ................... 366/80 |
| 7,677,787 | B2 | * | 3/2010 | Yamane et al. ................. 366/80 |
| 2010/0110822 | A1 | | 5/2010 | Yamada et al. |

FOREIGN PATENT DOCUMENTS

| | | |
|---|---|---|
| JP | 4 77428 | 7/1992 |
| JP | 5 8221 | 1/1993 |
| JP | 8 267540 | 10/1996 |
| JP | 10 138234 | 5/1998 |
| JP | 2001 9830 | 1/2001 |
| JP | 2002 187192 | 7/2002 |

OTHER PUBLICATIONS

Chinese Office Action issued Jul. 3, 2012 in Patent Application No. 200880114379.1 with English Translation.

* cited by examiner

FIG. 8

| OPERATING CONDITION 1 | OPERATING CONDITION 2 |
|---|---|
| NUMBER OF REVOLUTIONS : 260rpm | NUMBER OF REVOLUTIONS : 400rpm |
| FLOW RATE : 500Kg/h | FLOW RATE : 750Kg/h |
| TEMPERATURE : 240°C (SAME TEMPERATURE) | TEMPERATURE : 240°C (SAME TEMPERATURE) |

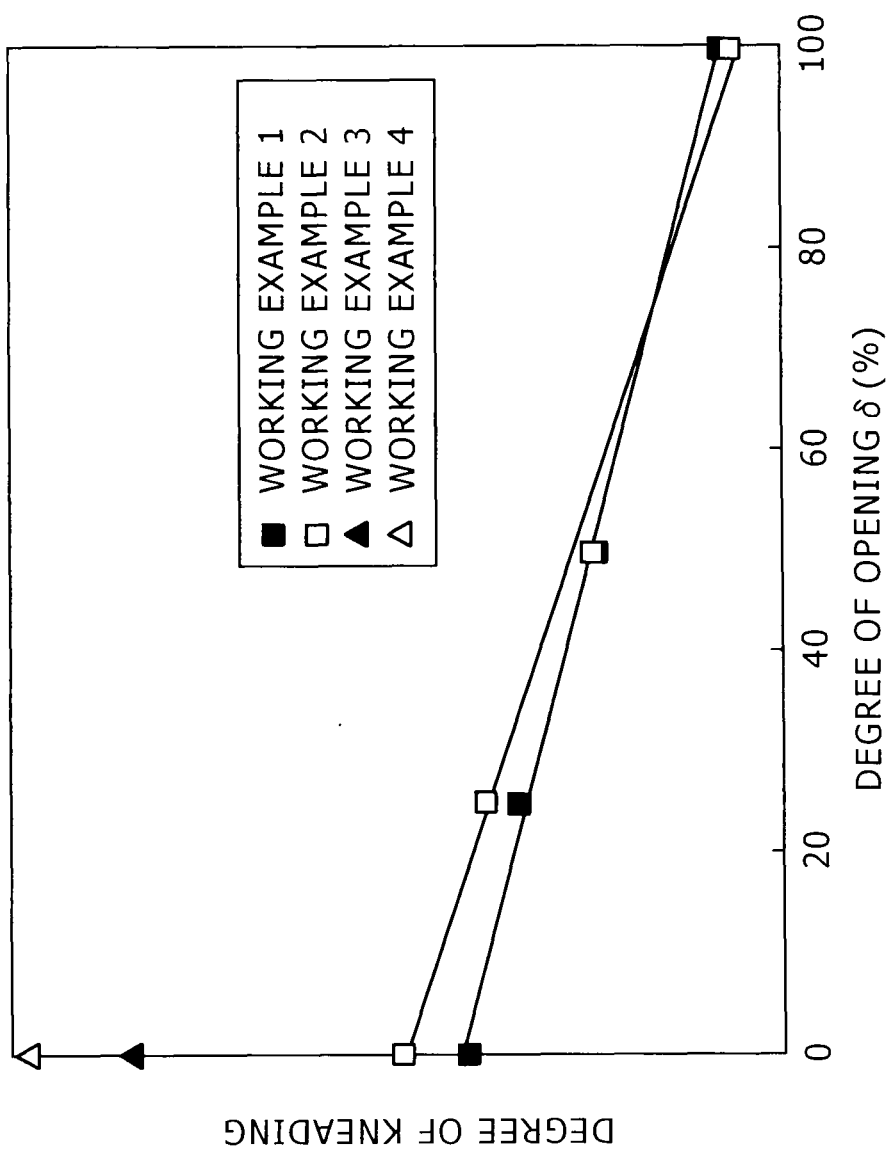

KNEADING DEGREE ADJUSTING MECHANISM, EXTRUDER, CONTINUOUS MIXER, KNEADING DEGREE ADJUSTING METHOD, AND KNEADING METHOD

TECHNICAL FIELD

The present invention relates to a kneading degree adjusting mechanism for adjusting the degree of kneading of a material to be kneaded, an extruder equipped with the kneading degree adjusting mechanism, a continuous mixer equipped with the kneading degree adjusting mechanism, a kneading degree adjusting method, and a kneading method.

BACKGROUND ART

An extruder or a continuous mixer includes a barrel, the barrel having an axially long cavity portion (chamber), and a kneading screw inserted into the interior of the barrel. The kneading screw includes a feed section for feeding a supplied material from an upstream side to a downstream side and a kneading section for imparting a shear force to the material to effect kneading, the feed section and the kneading section being axially disposed side by side. In the kneading section, an additive, e.g., filler, and a synthetic resin different from a matrix resin composed of thermoplastic resin are added to the matrix resin and kneading is performed to mix them with high dispersibility.

How long the material stays in the kneading section exerts a great influence on the degree of kneading of the material. For example, the longer the retention of the material in the kneading section, the larger the number of times of kneading and the higher the degree of material kneading. Conversely, if the material passes through the kneading section quickly, the number of times of kneading decreases and so does the degree of kneading. That is, the degree of material kneading can be enhanced by allowing the material to stay longer in the kneading section.

For the above purpose, in a conventional extruder or continuous mixer there is provided a kneading degree adjusting mechanism for damming up the flow of material on a downstream side of a kneading section, allowing the material to stay in the kneading section. This kneading degree adjusting mechanism adopts the types shown in (1) to (3) below.

(1) Gate Type Kneading Degree Adjusting Mechanism

In each of Patent Documents 1 to 12 there is disclosed a gate type kneading degree adjusting mechanism having gate members for damming up the flow of material. The gate members include a pair of plate-like members installed in an inner periphery of a barrel. From an inner wall of the barrel the gate members can protrude and retract to and from a chamber side formed in the interior of the barrel. When the gate members are protruded into the chamber, the material is dammed up and stays in the kneading section. As a result, the material kneading degree becomes high.

(2) Slot Bar Type Kneading Degree Adjusting Mechanism

In each of Patent Documents 13 to 16 there is disclosed a slot bar type kneading degree adjusting mechanism having gate bars for damming up the flow of material. The gate bars are each rotatable about an axis perpendicular to a barrel and cross the barrel so as to graze a part of an outer periphery surface of the barrel. The portion of each gate bar where the gate bar crosses the barrel is cut out so as to be along an inner periphery surface of the barrel in a fully open condition of a material channel. As the gate bar is rotated about its axis, a part of the gate bar approaches an outer periphery surface of a cylindrical portion of a kneading screw, whereby the gap between the barrel and the kneading screw is narrowed. As a result, the material stays in the kneading section and the material kneading degree becomes high.

The gate type and slot bar (gate bar) type kneading degree adjusting mechanisms are typical as kneading degree adjusting mechanisms. In each of Patent Documents 17 to 19 there is described a kneading degree adjusting mechanism of a type similar to the gate type or the slot bar type.

(3) Kneading Degree Adjusting Mechanisms of Other Types

In each of Patent Documents 20 to 23 there is described a kneading degree adjusting mechanism having on a downstream side of a kneading section a reduced-diameter section with a diameter smaller than that of the kneading section. In the reduced-diameter section it is possible to adjust the degree of narrowing of a material flow. That is, in the kneading degree adjusting mechanism, by narrowing the flow of material, the material stays in the kneading section and the degree of kneading becomes high.

In Patent Document 24 is described a kneading degree adjusting mechanism having a rotary valve. The rotary valve is provided with two discs each having a plurality of through holes spaced apart in the circumferential direction, the two discs being arranged axially side by side. That is, in this kneading degree adjusting mechanism, the through holes are opened or closed by displacing the discs circumferentially from each other. When the through holes are closed, the material stays in a kneading section and the degree of kneading becomes high.

In Patent Document 25 is described a kneading degree adjusting mechanism having a shielding wall for shutting off the flow of material. A resin channel is formed in the shielding wall so that the degree of opening thereof can be adjusted. That is, in this kneading degree adjusting mechanism, the degree of material kneading is adjusted by conducting the material into the resin channel formed in the shielding wall and then changing the degree of opening of the resin channel.

The above kneading degree adjusting mechanisms (1) to (3) involve the following problems.

(1) Problems of Gate Type Kneading Degree Adjusting Mechanism

In the gate type kneading degree adjusting mechanism, each gate member is cut out in conformity with either the outside diameter of a circular section part having a diameter smaller than the outside diameter of a kneading screw or the inside diameter of a barrel having almost equal diameter to a circular section part having equal diameter to the outside diameter of the kneading screw. When the gate member performs an opening motion, the shape of its cutout portion comes to be no longer in conformity with the inside diameter of the barrel or the outside diameter of the circular section part. Consequently, in either open or closed condition, the material stays in a stepped portion formed by a dent in the barrel inner wall or in a stepped portion formed by protrusion of the gate member, so that contamination is apt to occur.

In the gate type kneading degree adjusting mechanism, moreover, even in a fully closed condition of the gate members, a gap is formed between the kneading screw and the gate members to avoid a metal-to-metal contact between the kneading screw and the gate members. Therefore, it is difficult to let the narrowing effect be exhibited in the fully closed condition. In the gate type kneading degree adjusting mechanism there further arises the problem that a large space is needed for ensuring a gate opening/closing stroke to permit extraction of the kneading screw in maintenance.

Further, the gate type kneading degree adjusting mechanism involves the problem that at the beginning of gate opening it is impossible to adjust the kneading degree with a high accuracy. More particularly, the degree of kneading changes abruptly if the gate members are moved even slightly from the fully closed condition. Consequently, in the gate type kneading degree adjusting mechanism, the adjustment of narrowing becomes very difficult in an initial stage of opening of the gate members. This is known well to those skilled in the art.

(2) Problems of Slot Bar Type Kneading Degree Adjusting Mechanism

In the slot bar type kneading degree adjusting mechanism, each gate bar has both a cutout portion along the inner periphery surface of the barrel in a fully open condition of the gate bar and another cutout portion which approaches the circular section part of the kneading screw in a fully closed condition of the gate bar. Therefore, in the fully closed condition of the gate bars it is inevitable structurally that a large gap is formed between the gate bars and the outer periphery surface of the kneading screw, particularly between the gate bars and the kneading screw at right and left and central positions when looking at the cutout portions axially. Consequently, it is more difficult than the foregoing gate type to let the narrowing effect be exhibited.

In the slot bar type kneading degree adjusting mechanism, moreover, in both fully open and fully closed conditions, since the outer periphery surface of each gate bar is projected or depressed from the inner periphery surface of the barrel, the material to be kneaded is apt to stay in this portion. That is, in this kneading degree adjusting mechanism it is very likely that there will occur contamination due to the staying of the material to be kneaded, with consequent exertion of a bad influence on the product quality.

However, the most serious problem encountered in the slot bar type kneading degree adjusting mechanism is that the degree of kneading cannot be adjusted with a high accuracy, like the gate type kneading degree adjusting mechanism. That is, also in the slot bar type kneading degree adjusting mechanism, both arcuate portions, i.e., the gate bar cutout portion and the screw outer periphery surface, are moved closer to or apart from each other. Therefore, if the gate bars are rotated even slightly from the fully closed condition, the degree of kneading is apt to change abruptly. For this reason, adjustment of the degree of kneading, especially adjustment of narrowing in an initial stage of the opening motion of the gate bars, is very difficult.

(3) Problems of Other Types of Kneading Degree Adjusting Mechanisms

The kneading degree adjusting mechanisms of Patent Documents 20 to 25 each involve the problem that the conveyance volume of the screw, i.e., production capacity, is greatly limited because the reduced-diameter portion is provided and the problem that the operation for pulling out the screw from the barrel becomes complicated.

Patent Documents

1. Japanese Utility Model Laid Open No. Sho 57-181338
2. Japanese Patent Laid Open No. Hei 10-278099
3. Japanese Patent Laid Open No. Hei 10-305422
4. Japanese Patent Laid Open No. 2000-309017
5. Japanese Patent Publication No. Hei 06-43059
6. Japanese Patent Publication No. Hei 06-43060
7. Japanese Patent Publication No. Hei 06-41136
8. Japanese Utility Model Publication No. Hei 06-26340
9. Japanese Utility Model Publication No. Hei 07-56185
10. Japanese Patent No. 3035082
11. Japanese Patent No. 2638258
12. Japanese Patent No. 2601645
13. Japanese Patent Laid Open No. 2000-309018
14. Japanese Patent Laid Open No. 2003-33961
15. Japanese Patent Laid Open No. 2003-53725
16. Japanese Patent Laid Open No. 2003-71907
17. Japanese Patent Laid Open No. 2002-28963
18. Japanese Patent Laid Open No. Hei 06-155550
19. Japanese Patent Publication No. Hei 06-9814
20. Japanese Patent Laid Open No. Sho 58-87013
21. Japanese Patent Laid Open No. Hei 11-216762
22. Japanese Patent Laid Open No. Sho 56-5719
23. Japanese Patent Laid Open No. Sho 56-10411
24. Japanese Patent Laid Open No. 2001-170989
25. Japanese Patent Laid Open No. Sho 61-241123

DISCLOSURE OF THE INVENTION

The present invention has been accomplished in view of the above-mentioned problems and it is an object of the invention to make it possible to adjust the degree of kneading of a to-be-kneaded material with a high accuracy.

For achieving the above-mentioned object, the kneading degree adjusting mechanism according to the present invention is installed in a processing apparatus having a barrel and a kneading screw inserted into the barrel rotatably, the kneading screw having a kneading section and being adapted to rotate within the barrel to knead a material continuously while feeding the material from an upstream side toward a downstream side, the kneading degree adjusting mechanism including a push-back section for pushing back the material to the upstream side and thereby making the material stay around the kneading section, the push-back section being disposed downstream of the kneading section in the kneading screw, a kneading degree adjusting member having an opposed surface opposed to an outer periphery surface of the push-back section, and a drive section for actuating the kneading degree adjusting member so that the opposed surface moves toward or away from the push-back section.

The extruder according to the present invention includes a barrel, a kneading screw inserted into the barrel rotatably, the kneading screw having a kneading section and being adapted to rotate within the barrel to knead a material continuously while feeding the material from an upstream side toward a downstream side, and the above kneading degree adjusting mechanism, the kneading degree adjusting mechanism being disposed at a position corresponding to an axially intermediate portion of the kneading screw.

The continuous mixer according to the present invention includes a barrel, a kneading screw inserted into the barrel rotatably, the kneading screw having a kneading section and being adapted to rotate within the barrel to knead a material continuously while feeding the material from an upstream side toward a downstream side, and the above kneading degree adjusting mechanism, the kneading degree adjusting mechanism being disposed at a position corresponding to an axially intermediate portion of the kneading screw.

The kneading degree adjusting method, according to the present invention, for adjusting the degree of kneading of a material by making the material stay around a kneading section when kneading the material continuously while feeding the material from an upstream side toward a downstream side in the interior of a barrel by rotating a kneading screw, the kneading screw being inserted into the barrel and having a kneading section, includes the steps of: pushing back the material from the downstream side of the kneading section to around the kneading section; making changeable a material passing area of a channel on the downstream side of the kneading section and in which the material to be pushed back toward the kneading section is present; and thereby adjusting the degree of kneading of the material.

A method for kneading a material according to the present invention, includes the steps of: rotating a kneading screw, the kneading screw being inserted into a barrel and having a kneading section, to knead the material continuously while feeding the material from an upstream side toward a downstream side in the interior of a barrel; and making the material stay around the kneading section to adjust the degree of kneading of the material, wherein the adjustment of the kneading degree is performed by pushing back the material from the downstream side of the kneading section to around the kneading section, and making changeable a material passing area of a channel on the downstream side of the kneading section and in which the material to be pushed back toward the kneading section is present.

BRIEF DESCRIPTION OF THE DRAWINGS

FIG. 8 is a diagram showing operating conditions in kneading.

FIG. 10 is a diagram showing changes in the degree of kneading in working examples.

BEST MODE FOR CARRYING OUT THE INVENTION

Embodiments of the present invention will be described below with reference to the drawings.

First Embodiment

Figure 1:
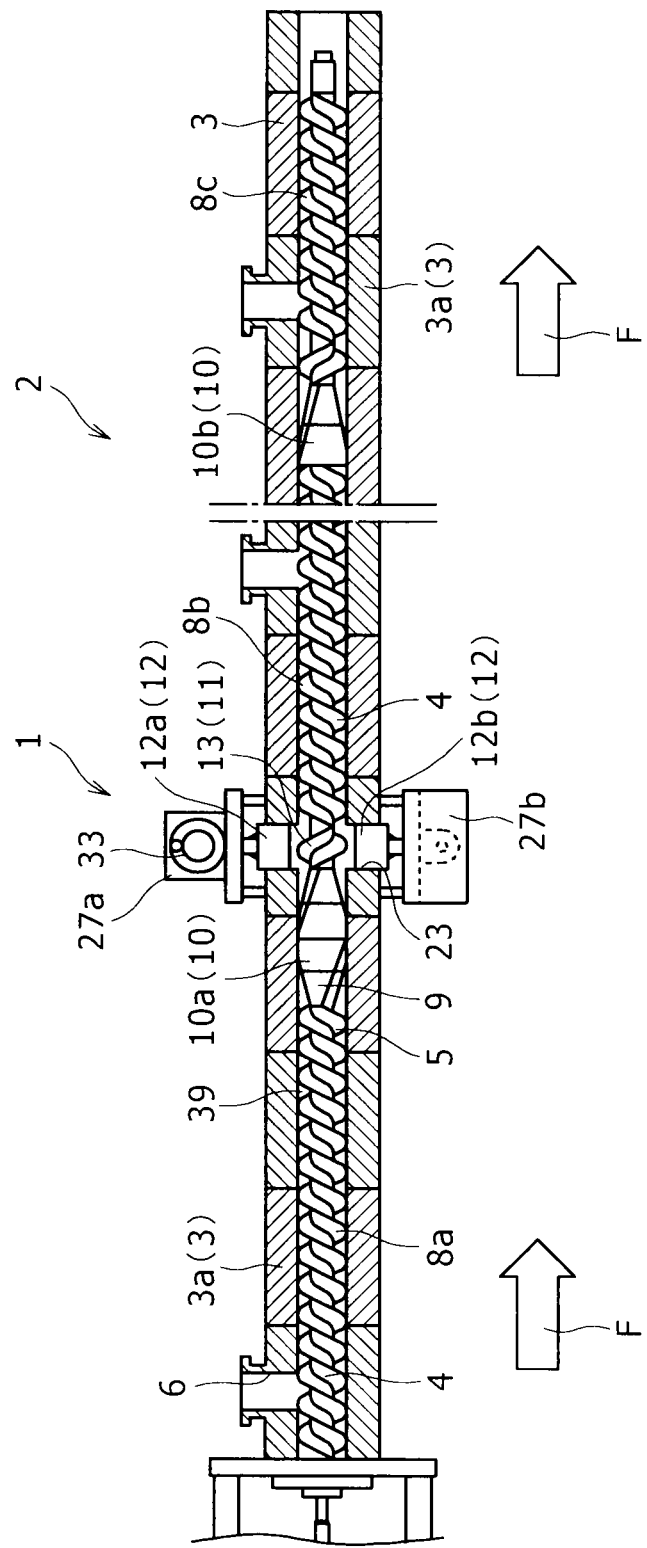
FIG. 1 is a sectional view of an extruder having a kneading degree adjusting mechanism according to a first embodiment of the present invention.

A kneading degree adjusting mechanism, an extruder, a kneading degree adjusting method and a kneading method according to a first embodiment of the present invention are shown in FIGS. 1 to 4. A kneading degree adjusting mechanism 1 according to the first embodiment is installed in an extruder 2 as a processing apparatus, as shown in FIG. 1. An apparatus configuration of the extruder 2 will be described below in detail. For the convenience of explanation it is assumed that in FIG. 1 the left side is an upstream side (supply side), while the right side is a downstream side (discharge side), and the right-and-left direction is an axial direction.

As in FIG. 1, the extruder 2 has a barrel 3, the barrel 3 being provided in the interior thereof with a cavity portion 39 (chamber), and a pair of right and left kneading screws 4 which are accommodated within the cavity portion 39. The barrel 3 is constructed by combining plural barrel segments 3a in the axial direction. The cavity portion 39 is formed by hollowing out the barrel 3 in such a manner that its cross section assumes an overlapped shape of a pair of circles, the circles overlapping each other in part of the respective circumferences at intermediate portions of the two, i.e., a glasses hole shape. The barrel 3 is provided with a heating device (not shown) using an electric heater or heated oil. With the heating device, a material M supplied to the interior of the barrel 3 can be heated from the outside.

The barrel 3 has a material supply port 6 on the upstream side. The material M can be supplied to the interior of the barrel 3 through the material supply port 6. The kneading screws 4 knead the material M while feeding the material continuously from the upstream side toward the downstream side, namely, in the direction of arrows F. The kneading screws 4 each include feed sections 8 for conveying the material M to the downstream side and kneading sections 10 for kneading the material M. The feed sections 8 and the kneading sections 10 are axially disposed side by side in each kneading screw 4. More specifically, in this embodiment, each kneading screw 4 is provided with a first feed section 8a, a first kneading section 10a, a second feed section 8b, a second kneading section 10b, and a third feed section 8c, which are disposed in this order from the upstream side.

The feed sections 8, namely, the first, second and third feed sections 8a, 8b, 8c, each include one or more screw segments 5 (screw sections) arranged axially. Each screw segment 5 is provided with screw flights 5a (helical blades). More specifically, each screw segment 5 has two screw flights 5a which are spirally twisted in the axial direction. The screw segment 5 feeds the material M from the upstream side to the downstream side by rotation of the screw flights 5a around the axis.

The kneading sections 10, namely, the first and second kneading sections 10a, 10b, each include one or more rotor segments 9 (kneading segment) arranged axially. The rotor segments 9 each have two kneading flights 9a (kneading blades) for kneading the material M. With the kneading flights 9a, the material M is kneaded while undergoing a shear force.

Figure 2:
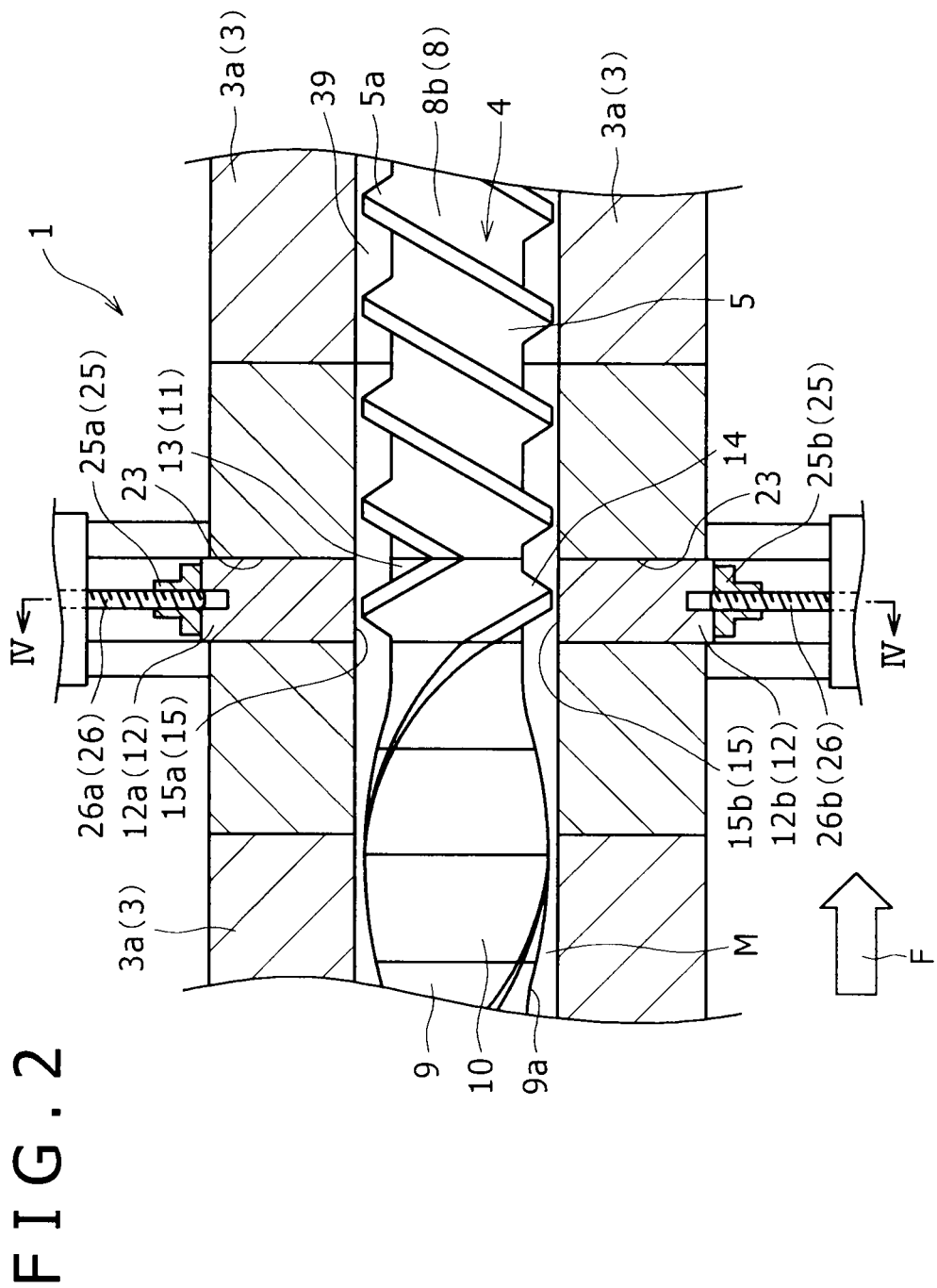
FIG. 2 is a sectional view of the kneading degree adjusting mechanism in a fully closed condition.
Figure 3:
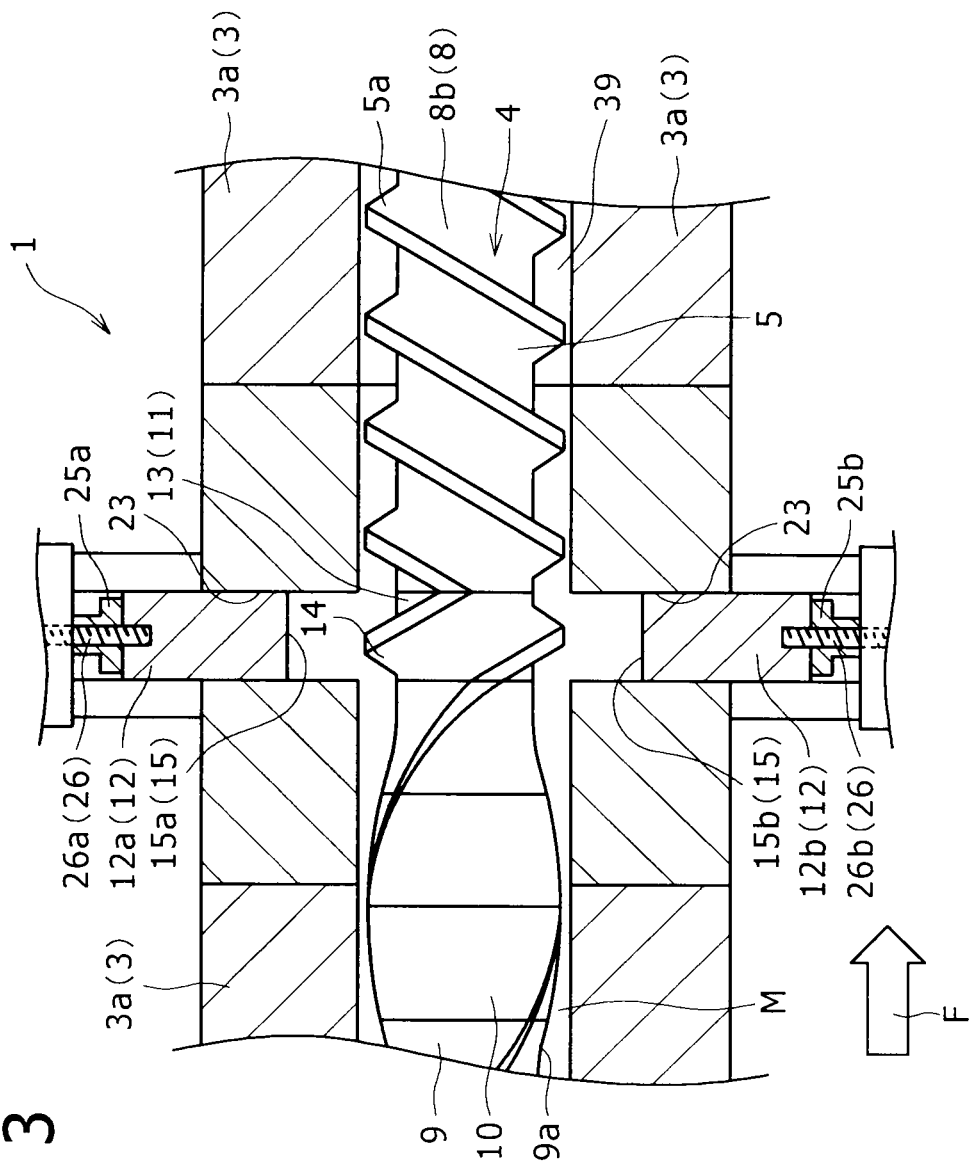
FIG. 3 is a sectional view of the kneading degree adjusting mechanism in a fully open condition.

As shown in FIGS. 2 and 3, the kneading degree adjusting mechanism 1 according to this embodiment is installed at a position corresponding to an axially intermediate portion of the kneading screws 4. More specifically, the kneading degree adjusting mechanism 1 is installed at a position adjacent to the downstream side of the first kneading section 10a (kneading section 10). For each of the kneading screws 4, the kneading degree adjusting mechanism 1 has a push-back section 11, kneading degree adjusting members 12 and a drive section 20. The push-back section 11, which is provided in each kneading screw 4, functions to push back the material M to the upstream side, thereby making the material stay in the kneading section 10 located on the upstream side. The kneading degree adjusting members 12 each have an opposed surface 15 opposed to an outer periphery surface of the push-back section 11. The drive section 20 actuates each kneading degree adjusting member 12 so that the opposed surfaces 15 of the kneading degree adjusting member 12 moves toward or away from the push-back section 11. The degree of kneading of the material M is adjusted by such movement of the opposed surfaces 15 of the kneading degree adjusting members 12 toward or away from the push-back section 11. The push-back section 11 is positioned within a cavity portion 39 formed in the interior of the barrel 3. In an axially intermediate portion of the barrel 3 are formed guide holes 23, the guide holes 23 intersecting the cavity portion 39 and extending vertically. The kneading degree adjusting members 12 are disposed in the guide holes 23 so as to be movable vertically.

The kneading degree adjusting mechanism 1 will be described below in detail with reference to FIGS. 2 to 4.

Figure 4:
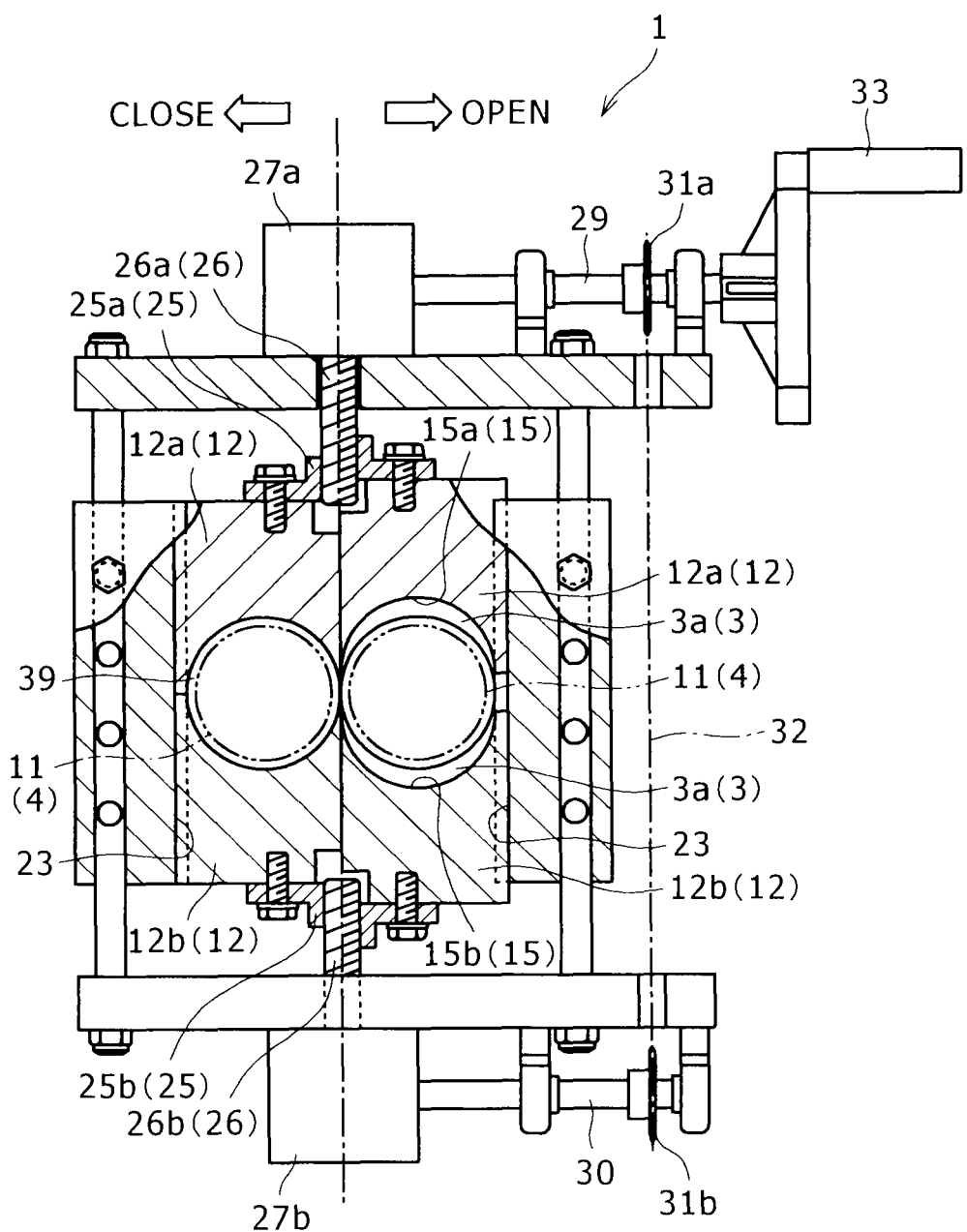
FIG. 4 is a sectional view taken along the line IV-IV in FIG. 2.

FIGS. 2 and 3 are sectional side views of the kneading degree adjusting mechanism 1 and FIG. 4 is a sectional front view of the kneading degree adjusting mechanism 1, i.e., a sectional view taken in a direction perpendicular to the axial direction of the kneading degree adjusting mechanism 1.

In this embodiment the push-back section 11 includes a return screw section 13 having a function to push back the material to the upstream side. A flight twist of the return screw section 13 is set in a direction opposite to that of the screw segment 5. The return screw section 13 has a twist angle which imparts to the material M an action of pushing back the material M in the direction opposite to the feed direction of the feed portion 8, that is, from the downstream side to the upstream side, upon rotation of each kneading screw 4.

The return screw section 13 has two return flights 14 projecting in radial directions opposite to each other with respect to a rotational center. The return flights 14 are included in the concept of helical blades in the push-back section defined in the present invention. The return flights 14 are twisted spirally in a direction opposite to that of the screw flights 5a of the screw segment 5, forming a cylindrical rotational path (outer peripheral surface) around the axis passing through the rotational center. A twist angle of each return flights 14 is set so as to feed the material M from the downstream side to the upstream side. The return screw section 13 has a length corresponding to one pitch of the return flights 14 axially in this embodiment lest the return flights 14 should be interrupted around the rotational center as seen axially from the upstream side. In this embodiment, one pitch corresponds to a half lead of one screw flight 5a.

The kneading degree adjusting members 12 for each kneading screw are plate-like members installed vertically movably in the interior of the associated guide hole 23. The kneading degree adjusting members 12 includes an upper member 12a and a lower member 12b disposed above and below the return screw section 13 respectively.

The kneading degree adjusting members 12 are further provided with opposed surfaces 15 which confront the outer periphery surface of the return screw section 13. The opposed surfaces 15 include an upper opposed surface 15a formed concavely on the lower side of the upper member 12a and a lower opposed surface 15b formed concavely on the upper side of the lower member 12b. The opposed surfaces 15 are each formed as an arcuate curved surface having a radius of curvature equal to the inner periphery surface of the barrel 3 and somewhat larger than a rotational outside diameter of the return screw section 13. The opposed surfaces 15 each have a length in the axial direction of the kneading screw 4 which length is equal to the length of the return screw section 13 and corresponds to one pitch of the return flight 14. A downstream end of each opposed surface 15 is located at substantially the same position as a downstream end of the return screw section 13 in the axial direction of the kneading screw 4. By "substantially the same" is meant to include an unavoidable positional displacement caused by the thermal expansion or an assembling error between the kneading screw 4 and the barrel 3.

The drive section 20 includes an upper traveling member 25a, a lower traveling member 25b, an upper driving shaft 26a, a lower driving shaft 26b, an upper gear box 27a (see FIG. 4), a lower gear box 27b (see FIG. 4), a driving shaft 29, a driven shaft 30, sprockets 31a and 31b, a chain 32, and an adjusting handle 33.

The upper member 12a of the kneading degree adjusting member 12 is connected to the driving shaft 29 via the upper traveling member 25a, the upper driving shaft 26a and the upper gear box 27a (see FIG. 4) which are disposed above the upper member 12a. The lower member 12b of the kneading degree adjusting member 12 is connected to the driven shaft 30 via the lower traveling member 25b, the lower driving shaft 26b and the lower gear box 27b (see FIG. 4) which are disposed below the lower member 12b.

The upper driving shaft 26a and the lower driving shaft 26b are screw shafts of mutually opposite threads. The upper traveling member 25a is screwed together with the upper driving shaft 26a, while the lower traveling member 25b is screwed together with the lower driving shaft 26b. Therefore, when the upper driving shaft 26a and the lower driving shaft 26b rotate in the same direction, the upper traveling member 25a and the lower traveling member 25b move in opposite directions in an up-and-down relation to each other.

The sprocket 31a is mounted on the driving shaft 29 and the sprocket 31b is mounted on the driven shaft 30. The chain 32 is put around both sprockets 31a and 31b, so that the driving shaft 29 and the driven shaft 30 can rotate synchronously with each other. The adjusting handle 33 is attached to the driving shaft 29. The driving shaft 29 can be rotated by the adjusting handle 33.

In the kneading degree adjusting method according to this embodiment, the material M having been kneaded in the kneading section 10 located on the upstream side is pushed back from the downstream side of the kneading section 10 toward the kneading section and it is made possible to change a material passing area of a channel where the material M is present at the position corresponding to the push-back portion, thereby making the material M stay around the kneading section 10 to adjust the degree of kneading of the material M. The operation of the kneading degree adjusting mechanism 1, i.e., the kneading degree adjusting method according to this embodiment, will now be described in detail using FIGS. 2 to 4. It is assumed that the state in which each opposed surface 15 is the closest to the return screw section 13 is the fully closed condition, while the state in which the opposed surface is the remotest from the return screw section 13 is the fully open condition.

As shown in the left half of FIG. 4, for increasing the degree of kneading of the material M, the kneading degree adjusting mechanism 1 is brought into the closed condition from the open condition by the following operation. That is, when the adjusting handle 33 is rotated in a predetermined direction, not only the driving shaft 29 rotates but also the driven shaft 30 rotates in synchronism with the driving shaft 29. The rotation of the driving shaft 29 is changed into the rotation of the upper driving shaft 26a via the upper gear box 27a, while the rotation of the driven shaft 30 is changed into the rotation of the lower driving shaft 26b via the lower gear box 27b. Since the upper driving shaft 26a is in an oppositely threaded relation to the lower driving shaft 26b, the upper traveling member 25a screwed together with the upper driving shaft 26a moves downwards, while the lower traveling member 25b screwed together with the lower driving shaft 26b moves upwards. As a result, the upper member 12a and the lower member 12b move downwards and upwards respectively and the kneading degree adjusting members 12 assume the closed condition.

Particularly, in the fully closed condition, as shown in FIG. 2, the opposed surfaces 15 of the kneading degree adjusting members 12 are closest to the outer periphery surface of the return screw section 13, the area of the material M-passing channel formed between the opposed surfaces 15 and the return screw section 13 becomes narrowest, and the returning effect by the return screw section 13 becomes maximum. Consequently, the material M stays on the upstream side of the return screw section 13, namely, around the kneading section 10, with consequent increase in the degree of kneading of the material M.

In the fully closed condition, the opposed surfaces 15 become flush with the inner periphery surface of the barrel 3 because the opposed surfaces 15 are formed as arcuate curved surfaces having a radius of curvature equal to the inner periphery surface of the barrel 3. Consequently, there no longer is formed a difference in height between the inner periphery surface of the barrel 3 and the opposed surfaces 15 and thus it is possible to prevent or suppress the occurrence of contamination caused by staying of the material M in the stepped portion.

Further, since the opposed surfaces 15 are formed as arcuate curved surfaces having a radius of curvature somewhat larger than the rotational outside diameter of the return screw section 13, the return flights 14 in the return screw section 13 are rotating in close proximity to the opposed surfaces 15. Therefore, the return flights 14 take off the material M adhered to the opposed surfaces 15. As a result, it is possible to prevent or suppress the occurrence of contamination caused by the adhesion of the material M to the opposed surfaces 15.

For decreasing the degree of kneading of the material M, as shown in the right half of FIG. 4, the kneading degree adjusting mechanism 1 is brought into the open condition by the following operation. That is, when the adjusting handle 33 is rotated in the direction opposite to its closing direction, the upper driving shaft 26a rotates and so does the lower driving shaft 26b. Consequently, the upper traveling member 25a screwed together with the upper driving shaft 26a moves upwards, while the lower traveling member 25b screwed together with the lower driving shaft 26b moves downwards. As a result, the kneading degree adjusting members 12 move away from the outer periphery surface of the push-back section 11 and the kneading degree adjusting members 12 assume the open condition.

Particularly in the fully open condition, as shown in FIG. 3, the opposed surfaces 15 of the kneading degree adjusting members 12 are remotest from the outer periphery surface of the return screw section 13, so that the area of the material M-passing channel formed between the opposed surfaces 15 and the return screw section 13 becomes widest and the returning effect by the return screw section 13 decreases. Consequently, the material M flows smoothly to the downstream side, with the result that the degree of kneading of the material M becomes lower.

In this open condition, the opposed surfaces 15 are positioned radially outwards with respect to the inner periphery surface of the barrel 3 and a stepped portion is formed between the inner periphery surface of the barrel 3 and each opposed surface 15. The material M is apt to stay in this stepped portion. However, if the kneading degree adjusting members 12 are brought into the fully closed condition periodically, the material M staying in the stepped portion is pushed out into the channel by each kneading degree adjusting member 12 and the material M thus forced out is fed to the downstream side together with the material M flowing in the channel. Thus, it is possible to suppress the occurrence of contamination caused by staying of the material M.

By moving the kneading degree adjusting members 12 toward and away from the return screw section 13 (push-back section 11), the material staying action by the kneading degree adjusting members 12 and the upstream push-back action of the return screw section 13 interact. Consequently, even if the kneading degree adjusting members 12 are opened or closed, the degree of kneading of the material M does not change abruptly, but changes linearly. Thus, adjustment of the degree of kneading of the material M is done easily and highly accurately.

In the kneading degree adjusting mechanism 1, moreover, since the kneading degree adjusting members 12 do not project from the inner periphery surface of the barrel 3 when they are fully closed, it becomes possible to prevent an increase of force acting in the material flowing direction which force is applied to the kneading degree adjusting members 12 from the material M. As a result, it is possible to lower a thrust force acting on each kneading screw 4, whereby it becomes possible to suppress an increase of load on a transmission, etc.

Second Embodiment

Figure 5:
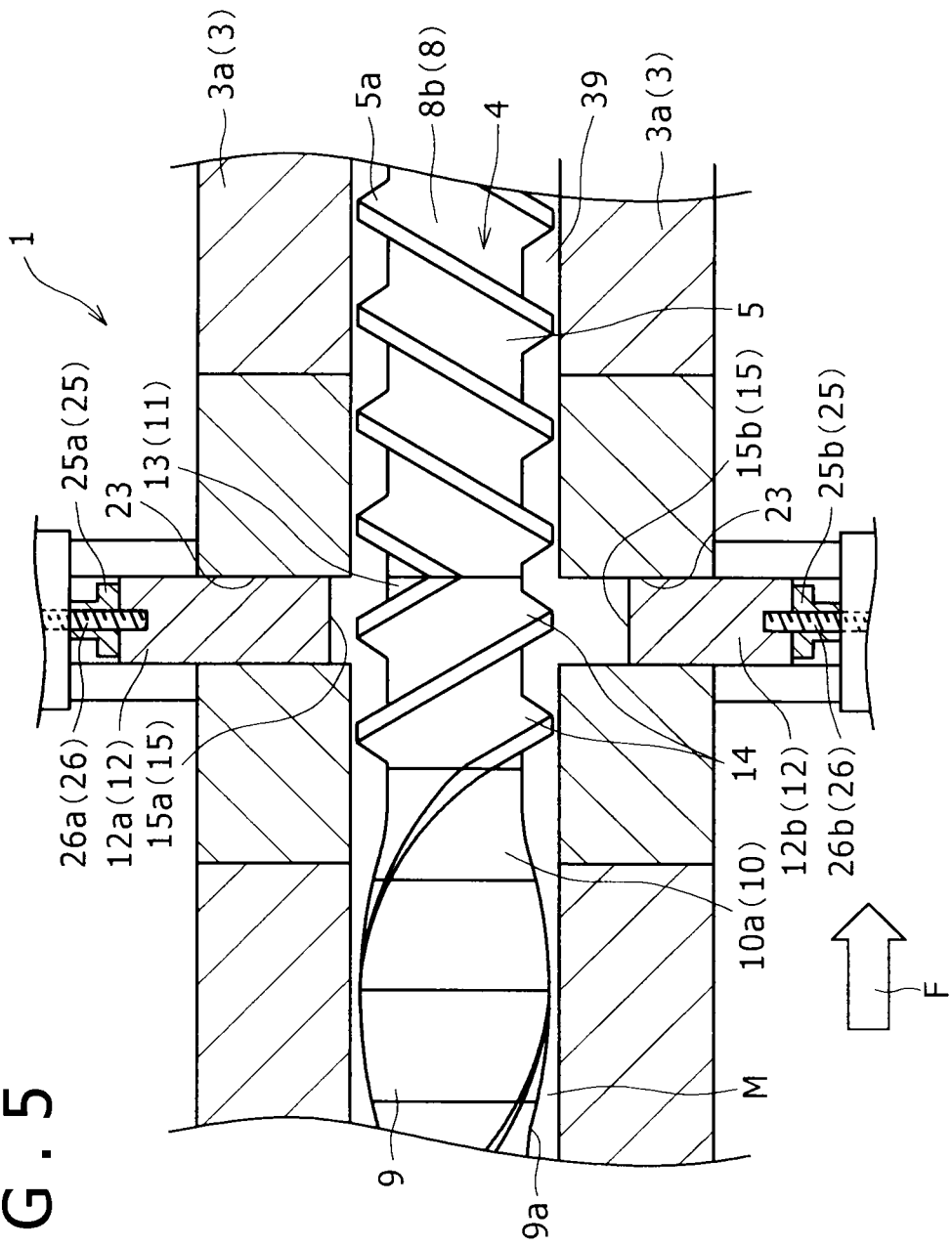
FIG. 5 is a sectional view of a kneading degree adjusting mechanism according to a second embodiment of the present invention.

FIG. 5 illustrates a kneading degree adjusting mechanism according to a second embodiment of the present invention. This second embodiment is the same as the first embodiment in that the downstream end of each kneading degree adjusting member 12 is located at substantially the same position as the downstream end of the push-back section 11 in the axial direction of each kneading screw 4. The most significant difference of this second embodiment over the kneading degree adjusting mechanism 1 of the above first embodiment is that the push-back section 11 is provided so as to confront the whole of each opposed surface 15 and also confronts the inner surface of the barrel 3 positioned on the upstream side of the opposed surface 15 in the axial direction of the kneading screw 4. In other words, an upstream end of the opposed surface 15 of each kneading degree adjusting member 12 is positioned downstream of an upstream end of the push-back portion 11 and the push-back portion 11 is formed axially longer than the kneading degree adjusting member 12.

By thus forming the push-back section 11 axially longer than the kneading degree adjusting member 12, the action of pushing back the material M to the upstream side by the push-back section 11 is enhanced. Consequently, the material M is apt to stay on the upstream side of the push-back section 11, namely, around the kneading section 10. As a result, it becomes possible to weaken the reaction at the beginning of opening the channel, that is, weaken the change in the amount of the material flowing to the downstream side. Therefore, in this second embodiment, it becomes possible to make the change in the degree of kneading smaller than in the first embodiment upon movement of the kneading degree adjusting members 12 and hence the operability in adjusting the degree of kneading is improved. As to the effect that the adjustment of the kneading degree for the material M is done easily and highly accurately, it is the same as in the first embodiment.

Other structural points than the above in the kneading degree adjusting mechanism 1 of the second embodiment are the same as in the first embodiment. Therefore, as to the other structural points than the above, explanations will here be omitted.

Third Embodiment

Figure 6:
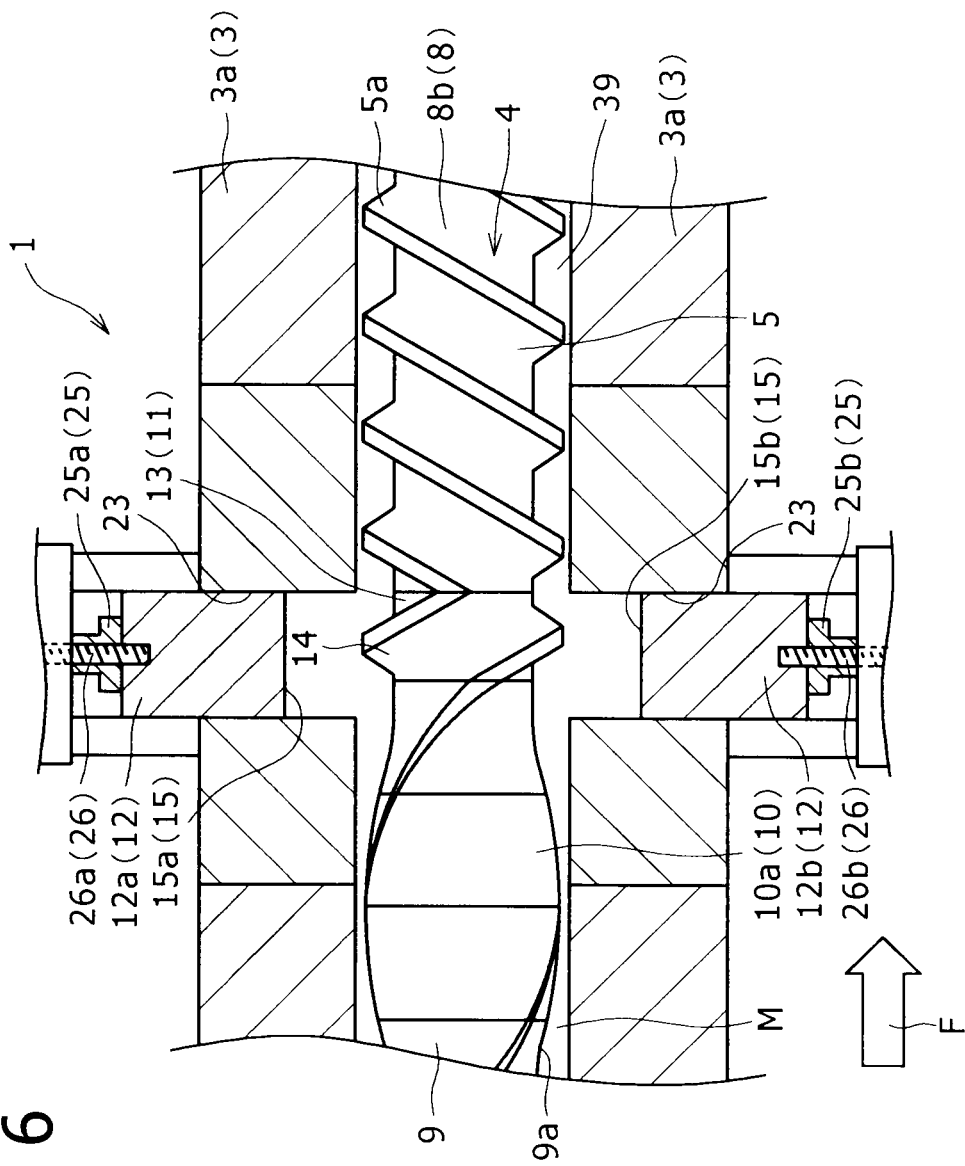
FIG. 6 is a sectional view of a kneading degree adjusting mechanism according to a third embodiment of the present invention.

FIG. 6 illustrates a kneading degree adjusting mechanism according to a third embodiment of the present invention. This third embodiment is the same as the first embodiment in that the downstream end of each kneading degree adjusting member 12 is located at substantially the same position as the downstream end of the push-back section 11 in the axial direction of each kneading screw 4. The most significant difference of this third embodiment over the kneading degree adjusting mechanism 1 of the above first embodiment is that the opposed surfaces 15 of the kneading degree adjusting members 12 are provided so as to confront the entire axial area of the outer periphery surface of the push-back section 11 and also confronts the kneading section 10 positioned upstream of the push-back section 11. In other words, the upstream end of the push-back section 11 is positioned downstream of the upstream end of the opposed surface 15 of each kneading degree adjusting member 12 and the kneading degree adjusting members 12 are each formed longer than the push-back section 11 axially.

By thus making each kneading degree adjusting member 12 longer than the push-back section 11 axially, when the channel is opened for adjusting the degree of kneading, it is possible to weaken the kneading action for the material M at the kneading degree adjusting member 12 which is formed longer than the push-back section 11. Consequently, it becomes possible to widen the kneading degree adjusting width upon movement of the kneading degree adjusting members 12. As to the effect that the adjustment of the kneading degree for the material M is done easily and highly accurately, it is the same as in the first embodiment.

Other structural points than the above of the kneading degree adjusting mechanism 1 of the third embodiment are the same as in the first and second embodiments. Therefore, as to the other structural points than the above, explanations will here be omitted.

In each of the first to third embodiments the kneading degree adjusting mechanism 1 is installed in the extruder 2. However, the kneading degree adjusting mechanism 1 can be installed not only in the extruder 2 but also in a continuous mixer. In this case, function and effect are the same as in the case of the extruder 2.

EXAMPLES

Figure 7:
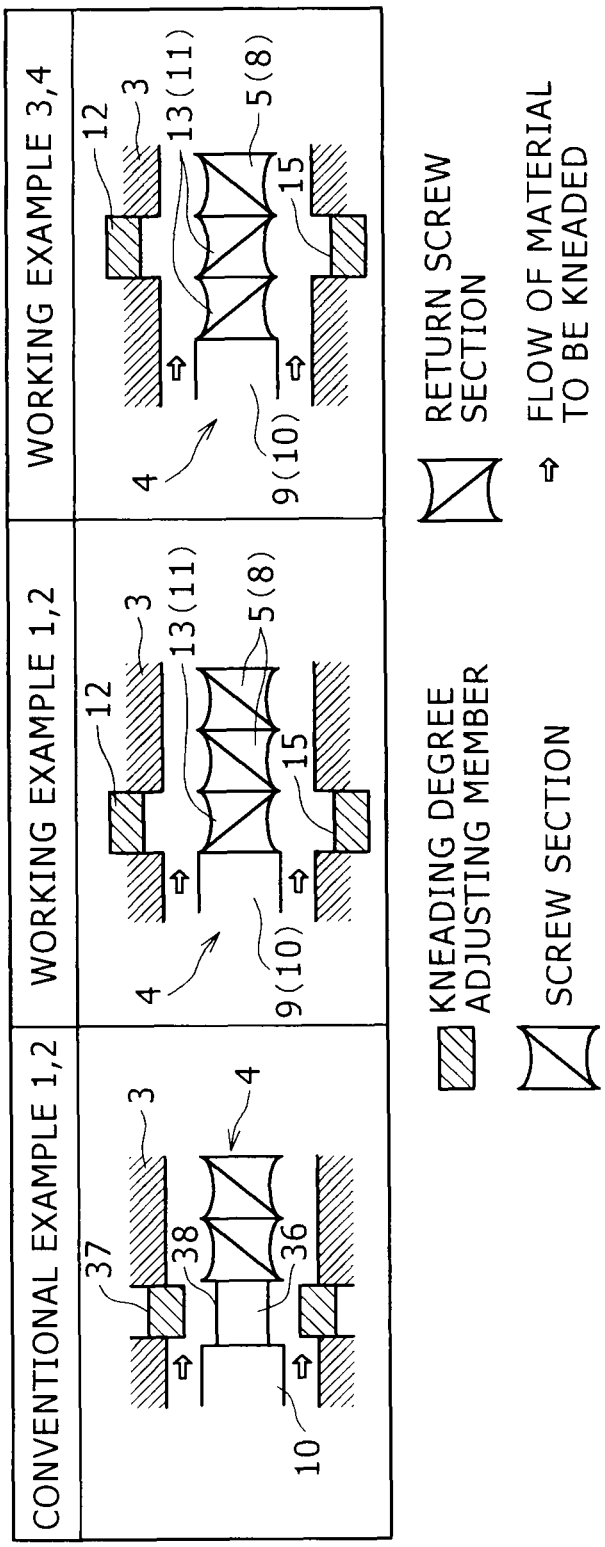
FIG. 7 is a schematic diagram of kneading degree adjusting mechanisms used in working examples and comparative examples.

Using Examples 1 to 4 and Conventional Examples 1, 2, a description will now be given about the effect of kneading degree adjusting mechanisms according to the present invention upon the degree of kneading. A processing apparatus used in Examples 1 to 4 and Conventional Examples 1, 2 is a co-rotating type extruder having two kneading screws 4, the kneading screws 4 each having a maximum rotational outside diameter of 72 mm and an overall length of 2 m and being intermeshed within a barrel 3. FIG. 7 schematically illustrates kneading degree adjusting mechanisms and FIG. 8 is a table showing an experimental condition for kneading.

Conventional Example 1

As shown schematically in the left column of FIG. 7, a kneading degree adjusting mechanism of Conventional Example 1 includes a shaft segment 36 and a gate member 37 corresponding to each kneading degree adjusting member 12 used in each of the above embodiments. The shaft segment 36 is secured to a kneading screw 4 on a downstream side of a kneading section 10. The shaft segment 36 is disposed at an axial position corresponding to a gate member 37 and has a peripheral surface of a diameter smaller than the outside diameter of the kneading screw 4. Two gate members 37 are provided. The gate members 37 are accommodated up and down respectively of the barrel 3 in a state in which two kneading screws are disposed between the gate members. As is the case with the kneading degree adjusting members 12, the gate members 37 are movable toward and away from the peripheral surface of the shaft segment 36.

In FIG. 8 there are shown operating conditions 1 for operating the kneading degree adjusting mechanism of Conventional Example 1. According to operating conditions 1, a material M, which is PP based resin, is kneaded at a flow rate (processing volume) of 500 kg/h while being heated within the barrel 3 held at 240° C. and while rotating the kneading screws 4 at 260 rpm.

Figure 9:
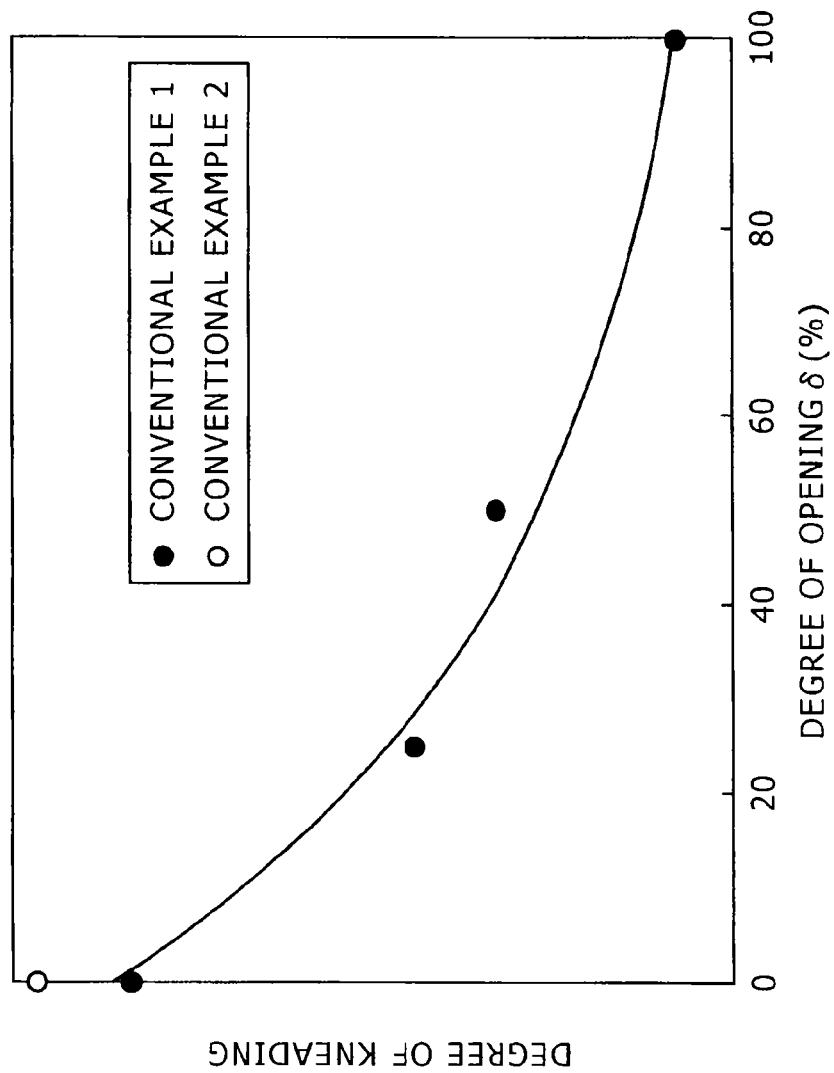
FIG. 9 is a diagram showing changes in the degree of kneading in conventional examples.

In FIG. 9, data indicated by solid black circles each represent a change in the degree of kneading of the material M relative to a degree of opening $\delta$ of the gate members 37 in Conventional Example 1. The degree of opening $\delta$ is represented in terms of percentage of a value obtained by dividing a moving distance of each gate member 37 from a fully open condition thereof by a maximum moving distance of the gate member 37. The fully open condition of the gate member 37 indicates a state in which the gate member 37 has approached the peripheral surface of a cutout portion 38, i.e., the shaft segment 36. The maximum moving distance of the gate member 37 indicates a moving distance of the gate member 37 from the fully open condition up to an adjustment limit of the kneading degree. The degree of kneading can be evaluated, for example, in terms of dispersibility of the kneaded material, a mixing degree showing how uniform the material became, or a retention time or a retention condition. In this example there is used a degree of kneading obtained from a difference in pressure between the upstream side and the downstream side of the kneading degree adjusting mechanism.

In Conventional Example 1, the degree of kneading decreases abruptly in a state in which the degree of opening $\delta$ is close to zero, more particularly, in a state up to arrival of the degree of opening $\delta$ at 20% from 0%, and then decreases gently as the degree of opening $\delta$ approaches 100%. That is, in Conventional Example 1, if each gate member 37 is moved in a state close to the fully closed condition, the degree of kneading changes abruptly and hence it is difficult to adjust the degree of kneading with a high accuracy.

Conventional Example 2

As shown schematically in the left column of FIG. 7, Conventional Example 2 uses the same kneading degree adjusting mechanism as in Conventional Example 1. Conventional Example 2 is different from Conventional Example 1 in that kneading is performed on the basis of an operating condition 2.

According to the operating condition 2, as in FIG. 8, a kneading process is carried out at a flow rate of 750 kg/h while heating the material M at the same temperature as in Example 1 and while rotating the kneading screws at 400 rpm.

In FIG. 9, data indicated by outline circles represent a degree of opening δ of the gate members 37 versus a change in the degree of kneading of the material M in Conventional Example 2. The degree of kneading in Conventional Example 2 is higher than that of Conventional Example 1 at a degree of opening δ of 0%, i.e., in the fully closed condition. This is presumed to be because kneading was carried out in such an operating condition as the number of revolutions of each kneading screw 4, i.e., the kneading volume, being larger than in Conventional Example 1.

Example 1

A kneading degree adjusting mechanism of Example 1 is schematically shown in the middle column of FIG. 7. The kneading degree adjusting mechanism of Example 1 corresponds to the kneading degree adjusting mechanism 1 shown in the first embodiment.

Data indicated by solid black squares in FIG. 10 each represent a change in the degree of kneading relative to the degree of opening δ of each kneading degree adjusting member 12 in Example 1, namely, relative to percentage of a value obtained by dividing a moving distance of the kneading degree adjusting member 12 by a maximum moving distance. The axis of abscissa and that of ordinate in FIG. 10 are also defined in the same manner as in Conventional Examples 1 and 2 of FIG. 9. The degree of kneading in Example 1 decreases almost constantly relative to an increase in the degree of opening δ of the kneading degree adjusting members 12 and thus linearity is recognized. That is, in Example 1, even in a state close to the fully closed condition, there is no such an abrupt change in the degree of kneading as in Conventional Examples 1 and 2. In Example 1, therefore, adjustment of the degree of kneading of the material M is performed easily and highly accurately.

Example 2

As shown in the middle column of FIG. 7, Example 2 uses the same kneading degree adjusting mechanism 1 of the first embodiment as in Example 1. However, Example 2 is different from Example 1 in that kneading is carried out on the basis of the operating condition 2.

Data indicated by outline squares in FIG. 10 each represent a change in the degree of kneading relative to the degree of opening δ of each kneading degree adjusting member 12 used in Example 2. The degree of kneading in Example 2 also decreases almost constantly relative to the degree of opening δ of each kneading degree adjusting member 12 as in Example 1, having linearity. Therefore, also in Example 2, the degree of kneading does not exhibit such an abrupt non-linear change as in Conventional Example 1 and adjustment of the degree of kneading of the material M is done easily and highly accurately as compared with Conventional Example 1. Moreover, in Example 2, inclination of the degree of kneading relative to the degree of opening δ is larger than in Example 1. This is presumed to be because the number of revolutions of each kneading screw, i.e., the kneading volume, is large in Example 2.

Example 3 and Example 4

A kneading degree adjusting mechanism used in Examples 3 and 4 is shown schematically in the right column of FIG. 7. This kneading degree adjusting mechanism corresponds to the kneading degree adjusting mechanism 1 shown in the second embodiment. That is, in Examples 1 and 2 the return screw section 13 and each kneading degree adjusting member 12 are of the same axial length (corresponding to one pitch), whereas in Examples 3 and 4 the return screw section 13 has an axial length (corresponding to two pitches) twice as large as the kneading degree adjusting member 12. As to other structural points of the apparatus than the above of Examples 3 and 4, they are the same as in the kneading degree adjusting mechanism of Examples 1 and 2.

Date indicated by a solid-black triangle in FIG. 10 represents a change in the degree of kneading relative to the degree of opening δ of each kneading degree adjusting member 12 in Example 3, while data indicated by an outline triangle in FIG. 10 represents a change in the degree of kneading relative to the degree of opening δ of each kneading degree adjusting member 12 in Example 4.

The kneading degrees in Examples 3 and 4 are higher than in Examples 1 and 2 at an opening degree δ=0. It is evident that the change in the degree of kneading relative to the degree of opening δ in Examples 3 and 4 is the same as in Examples 1 and 2, therefore, as to other degrees of kneading than the opening degree δ=0, they are omitted in FIG. 10. That the degrees of kneading in Examples 3 and 4 are higher than in Examples 1 and 2 at an opening degree δ=0 is because the kneading degree adjusting mechanism used in Examples 3 and 4 is larger in the push-back action against the material M than the kneading degree adjusting mechanism used in Examples 1 and 2. That is, in the kneading degree adjusting mechanism used in Examples 3 and 4, the return screw section 13 is provided so as to be longer to the axially upstream side than in the kneading degree adjusting mechanism used in Examples 1 and 2, thus resulting in a larger push-back action against the material M. Consequently, in Examples 3 and 4 the material M is more likely to stay in the kneading section 10 than in Examples 1 and 2. As a result, the material M is kneaded over a longer time in the kneading section 10 and the degree of kneading becomes high. In Examples 3 and 4, since the push-back action is outstanding, the flow of the material M to the downstream side becomes slower in comparison with the degree of opening of each kneading degree adjusting member 12, so that the change in the degree of kneading relative to the aforesaid degree of opening can be made gentle, or slow.

The present invention is not limited to the above embodiments, but changes may be made as necessary with respect to the shape, structure, material and combination of each member within the scope not altering the gist of the invention.

For example, in the first to third embodiments, the completely intermeshed twin-screw extruder 2 is shown as the processing apparatus. However, as the processing apparatus there may be used a single-screw extruder or an extruder other than the completely intermeshed type. A single-screw or twin-screw continuous mixer is also employable as the processing apparatus.

The positions of the feed section 8 and the kneading section 10 in each kneading screw 4 may be changed arbitrarily according to the type and use of the material M. The position is not limited to those shown in the first to third embodiments.

The kneading screws 4 used in the first to third embodiments each have two rotor segments 9 as kneading segments. However, as the kneading segments, there may be used kneading disc segments or both rotor segment and kneading disc segment. For example, in case of using kneading segments having an equal rotational diameter and an equal axial length, the number of such kneading segment(s) may be changed as necessary in the range from 1 to 20.

As to the push-back section 11 in the first to third embodiments, the return screw section 13 is used as the most preferable one. However, another type of a segment having a function of feeding the material M to the upstream side may be used in the push-back section 11. For example, a rotor segment or a kneading disc segment, having a blade portion with a twist angle opposite to that of the screw segment 5, or a twisted kneading disc segment having a twisted circumferential wall, may be used in the push-back section 11. In case of using a kneading disc segment in the push-back section 11, the push-back section 11 may be constructed using plural kneading discs which are phase-shifted in the circumferential direction and arranged axially so as to feed the material M from the downstream side to the upstream side.

Although in the above embodiments there is shown an example in which, as the kneading degree adjusting mechanism 1, the kneading degree adjusting members 12 are each operated manually with the adjusting handle 33, there may be adopted a kneading degree adjusting mechanism 1 provided with kneading degree adjusting members 12 which are actuated by another publicly known drive section, e.g., a kneading degree adjusting mechanism 1 wherein kneading degree adjusting members 12 are each actuated with a motor.

The present invention may be applicable also to a slot bar (gate bar) type kneading degree adjusting mechanism or the like. According to this type of a kneading degree adjusting mechanism, gate bars as kneading degree adjusting members are disposed at a position of the barrel corresponding to a push-back section of each kneading screw, and by rotating the gate bars, opposed surfaces of the gate bars opposed to the push-back section are moved toward or away from the push-back section, thereby opening or closing the gap between the barrel inner surface and an outer surface of the push-back section to adjust the degree of kneading of the material.

Although in the above embodiments there is shown an example in which one kneading degree adjusting mechanism 1 is provided at a position corresponding to an axially intermediate portion of the kneading screws 4, plural kneading degree adjusting mechanisms 1 may be disposed at plural axial positions of the kneading screws 4.

Outline of the Embodiments

The above embodiments may be outlined as follows.

The kneading degree adjusting mechanism according to each of the above embodiments is a kneading degree adjusting mechanism is installed in a processing apparatus having a barrel and a kneading screw inserted into the barrel rotatably, the kneading screw having a kneading section and being adapted to rotate within the barrel to knead a material continuously while feeding the material from an upstream side toward a downstream side, the kneading degree adjusting mechanism including a push-back section for pushing back the material to the upstream side and thereby making the material stay around the kneading section, the push-back section being disposed downstream of the kneading section in the kneading screw, a kneading degree adjusting member having an opposed surface opposed to an outer periphery surface of the push-back section, and a drive section for actuating the kneading degree adjusting member so that the opposed surface moves toward or away from the push-back section.

In the above kneading degree adjusting mechanism, the push-back section may have helical blades, the helical blades having a twist angle set so as to feed the material from the downstream side to the upstream side.

In the above kneading degree adjusting mechanism, the push-back section may include a plurality of kneading discs phase-shifted in the circumferential direction and arranged axially so as to feed the material from the downstream side to the upstream side.

In the structure wherein the push-back section has helical blades, the opposed surface of the kneading degree adjusting member preferably has a length in the axial direction of the kneading screw which length is set to a length not shorter than one pitch of the helical blades of the push-back section.

In the above kneading degree adjusting mechanism, preferably, a downstream end of the opposed surface of the kneading degree adjusting member is located at the same position as a downstream-side end of the push-back section in the axial direction of the kneading screw, and the kneading degree adjusting member has the same length as the push-back section in the axial direction of the kneading screw.

In the above kneading degree adjusting mechanism, the opposed surface of the kneading degree adjusting member may be disposed so as to confront the whole axial area of the outer periphery surface of the push-back section and also confront the kneading section positioned upstream of the push-back section.

In the above kneading degree adjusting mechanism, the push-back section may be disposed so as to confront the whole area of the opposed surface of the kneading degree adjusting member in the axial direction of the kneading screw and also confront a portion of an inner surface of the barrel which portion is positioned upstream of the opposed surface.

In the above kneading degree adjusting mechanism, the opposed surface of the kneading degree adjusting member is preferably formed so as to be flush with an inner surface of the barrel in a closest state thereof to the kneading screw.

In the above kneading degree adjusting mechanism, the kneading degree adjusting member may be disposed in an axially intermediate portion of the barrel.

The extruder according to each of the above embodiments includes a barrel, a kneading screw inserted into the barrel rotatably, the kneading screw having a kneading section and being adapted to rotate within the barrel to knead a material continuously while feeding the material from an upstream side toward a downstream side, and the above kneading degree adjusting mechanism, the kneading degree adjusting mechanism being disposed at a position corresponding to an axially intermediate portion of the kneading screw.

In the above extruder, the kneading degree adjusting mechanism may be disposed at plural positions disposed in the axial direction of the kneading screw The continuous mixer according to each of the above embodiment includes a barrel, a kneading screw inserted into the barrel rotatably, the kneading screw having a kneading section and being adapted to rotate within the barrel to knead a material continuously while feeding the material from an upstream side toward a downstream side, and the above kneading degree adjusting mechanism, the kneading degree adjusting mechanism being disposed at a position corresponding to an axially intermediate portion of the kneading screw.

In the above continuous mixer, the kneading degree adjusting mechanism may be disposed at plural positions disposed in the axial direction of the kneading screw.

The kneading degree adjusting method according to each of the above embodiments for adjusting the degree of kneading of a material by making the material stay around a kneading section when kneading the material continuously while feeding the material from an upstream side toward a downstream side in the interior of a barrel by rotating a kneading screw, the kneading screw being inserted into the barrel and having a kneading section, includes the steps of: pushing back the material from the downstream side of the kneading section to around the kneading section; making changeable a material passing area of a channel on the downstream side of the kneading section and in which the material to be pushed back toward the kneading section is present; and thereby adjusting the degree of kneading of the material.

The method for kneading a material according to each of the above embodiments, includes the steps of: rotating a kneading screw, the kneading screw being inserted into a barrel and having a kneading section, to knead the material continuously while feeding the material from an upstream side toward a downstream side in the interior of a barrel; and making the material stay around the kneading section to adjust the degree of kneading of the material, wherein the adjustment of the kneading degree is performed by pushing back the material from the downstream side of the kneading section to around the kneading section, and making changeable a material passing area of a channel on the downstream side of the kneading section and in which the material to be pushed back toward the kneading section is present.

The invention claimed is:

1. A processing apparatus comprising:
   a barrel;
   a kneading screw inserted into the barrel rotatably, the kneading screw being configured to rotate within the barrel to knead a material continuously while feeding the material from an upstream side toward a downstream side in an axial direction parallel to an axis of the kneading screw, the kneading screw including:
   a kneading section including kneading flights provided longitudinally throughout the kneading section in a uniform manner,
   a return screw section to push back the material to the upstream side, the return screw section including return flights provided longitudinally throughout the return screw section in a uniform manner, the return screw section making the material stay around the kneading section and disposed downstream of the kneading section in the kneading screw in the axial direction, and
   a feed section to convey a material to the downstream side, the feed section including screw flights provided longitudinally throughout the feed section in a uniform manner; and
   a kneading degree adjusting mechanism defined in part by the barrel and in part by the kneading screw, the kneading degree adjusting mechanism including:
   a kneading degree adjusting member having an opposed surface to an outer periphery surface of said return screw section, and
   a drive section to actuate said kneading degree adjusting member so that said opposed surface moves toward and away from said return screw section,
   wherein a position in the axial direction of a downstream end of the kneading degree adjusting member and a position in the axial direction of a downstream end of the return screw section are the same,
   wherein said opposed surface of said kneading degree adjusting member is formed so as to be flush with an inner surface of the barrel in a closest state thereof to the kneading screw,
   wherein a flight twist of the feed section is in an opposite direction of a flight twist of screw section,
   wherein the kneading degree adjusting member includes an upper member opposite an upper portion of the outer periphery surface of the return screw section and a lower member opposite a lower portion of the outer periphery surface of the return screw section,
   wherein the drive section includes an upper traveling member connected to the upper member, a lower traveling member connected to the lower member, an upper driving shaft screwed together with the upper traveling member, and a lower driving shaft screwed together with the lower traveling member,
   wherein when the upper driving shaft and the lower driving shaft rotate in the same direction, the upper traveling member and the lower traveling member move in opposite directions in a vertical relation to each other, and
   wherein the screw section ends at the downstream end of the return screw section and the feed section starts at the downstream end of the return screw section.

2. The processing apparatus according to claim 1, wherein said return screw section has a helical blade, said helical blade having a twist angle set so as to feed the material from the downstream side to the upstream side.

3. The processing apparatus according to claim 1, wherein the return screw section comprises a plurality of kneading discs phase-shifted in the circumferential direction and arranged axially so as to feed the material from the downstream side to the upstream side.

4. The processing apparatus according to claim 2, wherein said opposed surface of said kneading degree adjusting member has a length in the axial direction of the kneading screw which length is set to a length not shorter than one pitch of said helical blade of said return screw section.

5. The processing apparatus according to claim 1, wherein said kneading degree adjusting member has the same length as said return screw section in the axial direction of the kneading screw.

6. The processing apparatus according to claim 1, wherein said opposed surface of said kneading degree adjusting member is disposed so as to confront the whole axial area of the outer periphery surface of said return screw section and also confront the kneading section positioned upstream of said return screw section.

7. The processing apparatus according to claim 1, wherein said return screw section is disposed so as to confront the whole area of said opposed surface of said kneading degree adjusting member in the axial direction of the kneading screw and also confront a portion of an inner surface of the barrel which portion is positioned upstream of said opposed surface.

8. The processing apparatus according to claim 1, wherein said kneading degree adjusting member is disposed in an axially intermediate portion of the barrel.

9. An extruder comprising:
   the processing apparatus described in claim 1,
   wherein said kneading degree adjusting mechanism is disposed at a position corresponding to an axially intermediate portion of said kneading screw.

10. The extruder according to claim 9, wherein said kneading degree adjusting mechanism is disposed at plural positions disposed in the axial direction of said kneading screw.

11. A continuous mixer comprising:
the processing apparatus described in claim 1,
wherein said kneading degree adjusting mechanism is disposed at a position corresponding to an axially intermediate portion of said kneading screw.

12. The continuous mixer according to claim 11, wherein said kneading degree adjusting mechanism is disposed at plural positions disposed in the axial direction of said kneading screw.

13. The processing apparatus according to claim 1, wherein the kneading section, the return screw section and the feed section are arranged continuously and sequentially from the upstream side toward the downstream side.

14. The processing apparatus according to claim 1, wherein a flight twist of the kneading section is in a same direction as a flight twist of the return screw section.

15. A processing apparatus comprising:
a barrel;
a kneading screw inserted into hu barrel rotatably, the kneading screw being configured to rotate within the barrel to knead a material continuously while feeding the material from an upstream side toward a downstream side in an axial direction parallel to an axis of the kneading screw, the kneading screw including:
a kneading section including kneading flights provided longitudinally throughout the kneading section in a uniform manner,
a return screw section to push back the material to the upstream side, the return screw section including return flights provided longitudinally throughout the return screw section in a uniform manner, the return screw section making the material stay around the kneading section and disposed downstream of the kneading section in the kneading screw in the axial direction, and
a feed section to convey a material to the downstream side, the feed section including screw flights provided longitudinally throughout the feed section in a uniform manner; and
a kneading degree adjusting mechanism defined in part by the barrel and in part by the kneading screw, the kneading degree adjusting mechanism including:
a kneading degree adjusting member having an opposed surface to an outer periphery surface of said return screw section, and
a drive section to actuate said kneading degree adjusting member so that said opposed surface moves toward and away from said return screw section,
wherein a position in the axial direction of a downstream end of the kneading degree adjusting member and a position in the axial direction of a downstream end of the return screw section are the same,
wherein a flight twist of the feed section is in an opposite direction of a flight twist of the return screw section,
wherein the return screw section ends at the downstream end of the return screw section and the feed section starts at the downstream end of the return screw section.

16. The processing apparatus according to claim 15, wherein the kneading section, the return screw section and the feed section are arranged continuously and sequentially from the upstream side toward the downstream side.

17. The processing apparatus according to claim 15, wherein a pitch of the kneading flights is substantially longer than a pitch of the return flights.

18. The processing apparatus according to claim 17, wherein the pitch of the return flights is substantially the same as a pitch of the screw flights.

19. The processing apparatus according to claim 1, wherein a pitch of the kneading flights is substantially longer than a pitch of the return flights.

20. The processing apparatus according to claim 19, wherein the pitch of the return flights is substantially the same as a pitch of the screw flights.

* * * * *